United States Patent
Lu et al.

(10) Patent No.: US 10,673,534 B2
(45) Date of Patent: Jun. 2, 2020

(54) SIGNAL PROCESSING METHOD, APPARATUS, AND OPTICAL FIBER TRANSMISSION SYSTEM

(71) Applicant: HUAWEI TECHNOLOGIES CO., LTD., Shenzhen (CN)

(72) Inventors: Yanzhao Lu, Dongguan (CN); Yuanda Huang, Dongguan (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/425,954

(22) Filed: May 30, 2019

(65) Prior Publication Data
US 2019/0280777 A1 Sep. 12, 2019

Related U.S. Application Data

(63) Continuation of application No. PCT/CN2016/108090, filed on Nov. 30, 2016.

(51) Int. Cl.
| | | |
|---|---|---|
| *H04B 10/516* | (2013.01) | |
| *H04B 10/60* | (2013.01) | |
| *H04B 10/556* | (2013.01) | |
| *H04B 10/25* | (2013.01) | |
| *H04B 1/68* | (2006.01) | |
| *H04N 21/61* | (2011.01) | |

(52) U.S. Cl.
CPC .......... *H04B 10/5563* (2013.01); *H04B 1/68* (2013.01); *H04B 10/25* (2013.01); *H04B 10/60* (2013.01); *H04N 21/61* (2013.01)

(58) Field of Classification Search
CPC ...... H04B 10/516–5563; H04B 10/616; H04B 10/69
See application file for complete search history.

(56) References Cited

U.S. PATENT DOCUMENTS

| | | |
|---|---|---|
| 2005/0013618 A1 | 1/2005 | Kurebayashi |
| 2012/0207206 A1 | 8/2012 | Samardzija et al. |
| 2017/0126319 A1* | 5/2017 | Cavaliere .......... H04B 10/2575 |

(Continued)

FOREIGN PATENT DOCUMENTS

| | | |
|---|---|---|
| CN | 101046558 A | 10/2007 |
| CN | 102355304 A | 2/2012 |
| CN | 102714551 A | 10/2012 |

(Continued)

OTHER PUBLICATIONS

Ilya Lyubomirsky: "Coherent Duobinary Systems for High-Speed Optical Satellite Networks", SPIE, PO Box 10 Bellingham WA 98227-0010 USA, Dec. 31, 2006, XP040228519, 9 pages.

*Primary Examiner* — Shi K Li
(74) *Attorney, Agent, or Firm* — Kilpatrick Townsend & Stockton LLP

(57) ABSTRACT

A signal processing method is provided. Under the method, a first digital signal can be obtained by an optical transmitter. The first digital signal is a one-dimensional bipolar digital signal. A spectral compression and filtering can be performed by the optical transmitter on the first digital signal to generate a second digital signal. A frequency shift can be performed by the optical transmitter on the second digital signal such that a center location of a spectrum of the frequency-shifted second digital signal is at a frequency of 0.

14 Claims, 10 Drawing Sheets

(56) References Cited

U.S. PATENT DOCUMENTS

2019/0245618 A1\* 8/2019 Bruno ................... H04B 10/61

FOREIGN PATENT DOCUMENTS

| CN | 103067075 A | 4/2013 |
| CN | 103370881 A | 10/2013 |
| CN | 104836773 A | 8/2015 |
| CN | 105099461 A | 11/2015 |
| CN | 106059663 A | 10/2016 |
| EP | 0917325 B1 | 5/1999 |
| WO | 0060871 A1 | 10/2000 |

\* cited by examiner

SIGNAL PROCESSING METHOD, APPARATUS, AND OPTICAL FIBER TRANSMISSION SYSTEM

CROSS-REFERENCE TO RELATED APPLICATIONS

This application is a continuation of International Application No. PCT/CN2016/108090, filed on Nov. 30, 2016, the disclosure of which is hereby incorporated by reference in its entirety.

TECHNICAL FIELD

Embodiments of the present disclosure relate to the field of optical communication, and in particular, to a signal processing method, an apparatus, and an optical fiber transmission system.

BACKGROUND

As a terminal device has an increasingly high demand on network traffic, an optical fiber transmission system has increasingly high requirements on a transmission bandwidth and a transmission rate. The optical fiber transmission system is a transmission system in which an optical fiber is used as a main transmission medium, and has features such as a high transmission speed and a long transmission distance.

An existing optical fiber transmission system usually includes a plurality of optical transceivers. Each optical transceiver includes an optical transmitter configured to transmit an optical signal and an optical receiver configured to receive an optical signal. A transmission rate of the existing optical fiber transmission system is usually 100 gigabits per second (Gbps). An increase in the transmission rate of the optical fiber transmission system is subject to technology development of the optical transceiver. For example, if the transmission rate of the optical fiber transmission system needs to be 400 Gbps, a sampling rate of a digital-to-analog converter (DAC) in the optical transmitter needs to be increased correspondingly. An existing DAC with a high sampling rate has excessively high costs. Consequently, an optical fiber transmission system with a high transmission rate is implemented at relatively high costs.

SUMMARY

Embodiments of the present disclosure provide a signal processing method, an apparatus, and an optical fiber transmission system, so that a transmission rate of an optical fiber transmission system can be increased without changing an existing optical transceiver structure.

To achieve the foregoing objective, the following technical solutions are used in the embodiments of the present disclosure:

According to a first aspect, an embodiment of the present disclosure provides a signal processing method. The signal processing method includes: First, an optical transmitter obtains a first digital signal (where the first digital signal is a one-dimensional bipolar digital signal); then, the optical transmitter performs spectral compression and filtering on the first digital signal to generate a second digital signal; and finally, the optical transmitter performs frequency shift on the second digital signal, where a center location of a spectrum of the frequency-shifted second digital signal is at a frequency of 0.

It may be learned that the optical transmitter can perform spectral compression and filtering on the first digital signal to generate the second digital signal, so that compared with a spectral bandwidth of the first digital signal, a spectral bandwidth of the second digital signal is reduced. When spectral compression is performed on a digital signal, a spectral bandwidth of the digital signal is related to a value of a roll down factor of a pulse shaping digital filter in the optical transmitter. In addition, the spectral bandwidth of the digital signal generated after only the spectral compression is approximately a half of the spectral bandwidth of the digital signal before the compression. A high transmission rate of an optical fiber transmission system still cannot be satisfied. Therefore, the optical transmitter further performs frequency shift on the second digital signal, so that the spectral bandwidth of the frequency-shifted second digital signal is further reduced. In this way, requirements on a sampling rate and a bandwidth of a DAC when the optical transmitter transmits the second digital signal are reduced, so that a transmission rate of the optical fiber transmission system can be increased without changing an existing optical transceiver structure.

Further, a method for the obtaining, by an optical transmitter, a first digital signal may include: obtaining, by the optical transmitter, a random sequence, and mapping the random sequence to generate the first digital signal.

Optionally, the first digital signal satisfies $X=\pm(kn+1)$, where k is a constant of any value, $n \in 0, 1, 2, \ldots$ and n is an integer greater than or equal to 0.

Further, a method for the performing, by the optical transmitter, spectral compression and filtering on the first digital signal to generate a second digital signal may include: First, the optical transmitter performs spectral compression on the first digital signal to generate a third digital signal, where a spectral bandwidth of the third digital signal is less than a spectral bandwidth of the first digital signal; and then, the optical transmitter performs filtering on the third digital signal to generate the second digital signal, where the second digital signal is a positive spectral part or a negative spectral part of the third digital signal.

Further, after the performing, by the optical transmitter, frequency shift on the second digital signal, the method further includes: The optical transmitter resamples the second digital signal to adapt to the sampling rate of the DAC, and transmits the resampled second digital signal to an optical receiver, so that the peer end optical receiver receives the second digital signal.

Further, the spectrum of the second digital signal further includes a carrier, so that the peer end optical receiver detects the second digital signal based on the carrier.

Optionally, the optical transmitter can add a carrier to the spectrum of the second digital signal.

According to a second aspect, an embodiment of the present disclosure provides a signal processing method. The signal processing method includes: First, an optical receiver performs frequency shift on a second digital signal, where a spectral edge of the second digital signal after the frequency shift is at a frequency of 0; and then, the optical receiver recovers the second digital signal after the frequency shift, to generate a first digital signal, where the first digital signal is a one-dimensional bipolar digital signal.

It may be learned that the optical receiver can perform frequency shift on the second digital signal, and recover the second digital signal after the frequency shift to generate the first digital signal, so that the second digital signal having a relatively low spectral bandwidth is recovered to the first digital signal having a relatively high spectral bandwidth. In this way, requirements on a sampling rate and a bandwidth of an analog-to-digital converter (ADC) when the optical receiver receives the second digital signal are reduced, so that a transmission rate of an optical fiber transmission system is increased without changing an existing optical transceiver structure.

Further, a method for the recovering, by the optical receiver, the second digital signal after the frequency shift to generate a first digital signal may include: First, the optical receiver performs filtering recovery on the second digital signal after the frequency shift, to generate a third digital signal, where the second digital signal is a positive spectral part or a negative spectral part of the third digital signal; and then, the optical receiver performs spectral compression recovery on the third digital signal to generate the first digital signal, where a spectral bandwidth of the third digital signal is less than a spectral bandwidth of the first digital signal.

Further, before the performing, by an optical receiver, frequency shift on a second digital signal, the method further includes: The optical receiver receives the second digital signal transmitted by an optical transmitter, and resamples the second digital signal, to adapt to the sampling rate of the ADC and a processing rate of a DSP.

Further, the spectrum of the second digital signal further includes a carrier, so that the optical receiver detects the second digital signal based on the carrier.

According to a third aspect, an embodiment of the present disclosure provides an optical transmitter. The optical transmitter includes a processor. The processor is configured to: obtain a first digital signal, where the first digital signal is a one-dimensional bipolar digital signal; perform spectral compression and filtering on the first digital signal to generate a second digital signal; and perform frequency shift on the second digital signal, where a center location of a spectrum of the frequency-shifted second digital signal is at a frequency of 0.

It may be learned that the optical transmitter can perform spectral compression and filtering on the first digital signal to generate the second digital signal, so that compared with a spectral bandwidth of the first digital signal, a spectral bandwidth of the second digital signal is reduced. When spectral compression is performed on a digital signal, a spectral bandwidth of the digital signal is related to a value of a roll down factor of a pulse shaping digital filter in the optical transmitter. In addition, the spectral bandwidth of the digital signal generated after only the spectral compression is approximately a half of the spectral bandwidth of the digital signal before the compression. A high transmission rate of an optical fiber transmission system still cannot be satisfied. Therefore, the optical transmitter further performs frequency shift on the second digital signal, so that the spectral bandwidth of the frequency-shifted second digital signal is further reduced. In this way, requirements on a sampling rate and a bandwidth of a DAC when the optical transmitter transmits the second digital signal are reduced, so that a transmission rate of the optical fiber transmission system can be increased without changing an existing optical transceiver structure.

Further, the processor is configured to: obtain a random sequence, and map the random sequence to generate the first digital signal.

Optionally, the first digital signal satisfies $X=\pm(kn+1)$, where k is a constant of any value, $n \in 0, 1, 2, 3 \ldots$ and n is an integer greater than or equal to 0.

Further, the processor is configured to: perform spectral compression on the first digital signal to generate a third digital signal, where a spectral bandwidth of the third digital signal is less than a spectral bandwidth of the first digital signal; and perform filtering on the third digital signal to generate the second digital signal, where the second digital signal is a positive spectral part or a negative spectral part of the third digital signal.

Further, the optical transmitter further includes a transmitter. The processor is further configured to resample the second digital signal after performing frequency shift on the second digital signal; and the transmitter is configured to: after the processor resamples the second digital signal, transmit the resampled second digital signal to an optical receiver, so that the peer end optical receiver receives the second digital signal.

Further, the spectrum of the second digital signal further includes a carrier, so that the peer end optical receiver detects the second digital signal based on the carrier.

According to a fourth aspect, an embodiment of the present disclosure further provides an optical receiver. The optical receiver includes a processor. The processor is configured to: perform frequency shift on a second digital signal, where a spectral edge of the second digital signal after the frequency shift is at a frequency of 0; and recover the second digital signal after the frequency shift to generate a first digital signal, where the first digital signal is a one-dimensional bipolar digital signal.

It may be learned that the optical receiver can perform frequency shift on the second digital signal, and recover the second digital signal after the frequency shift to generate the first digital signal, so that the second digital signal having a relatively low spectral bandwidth is recovered to the first digital signal having a relatively high spectral bandwidth. In this way, requirements on a sampling rate and a bandwidth of an ADC when the optical receiver receives the second digital signal are reduced, so that a transmission rate of an optical fiber transmission system is increased without changing an existing optical transceiver structure.

Further, the processor is configured to: perform filtering recovery on the second digital signal after the frequency shift, to generate a third digital signal, where the second digital signal is a positive spectral part or a negative spectral part of the third digital signal; and perform spectral compression recovery on the third digital signal, to generate the first digital signal, where a spectral bandwidth of the third digital signal is less than a spectral bandwidth of the first digital signal.

Further, the optical receiver further includes a receiver. The receiver is configured to: before the processor performs frequency shift on the second digital signal, receive the second digital signal transmitted by an optical transmitter; and the processor is further configured to: after the receiver receives the second digital signal transmitted by the optical transmitter, resample the second digital signal.

Further, the spectrum of the second digital signal further includes a carrier, so that the optical receiver detects the second digital signal based on the carrier.

According to a fifth aspect, an embodiment of the present disclosure provides an optical transceiver. The optical transceiver includes an optical transmitter having any feature of the third aspect and an optical receiver having any feature of the fourth aspect.

According to a sixth aspect, an embodiment of the present disclosure further provides an optical fiber transmission system. The optical fiber transmission system includes at least one optical transmitter having any feature of the third aspect and at least one optical receiver having any feature of the fourth aspect; or includes at least one optical transceiver having any feature of the fifth aspect.

In this application, names of the optical receiver, the optical transmitter, and the optical transceiver do not constitute a limitation on the devices or functional modules. During actual implementation, these structures may have other names, provided that functions of the structures are similar to those in this application and fall within the scope defined by the claims and equivalent technologies of this application.

For detailed descriptions of the second aspect to the sixth aspect and various implementations thereof in this application, refer to detailed descriptions of the first aspect and the various implementations thereof. In addition, for beneficial effects of the second aspect to the sixth aspect and the implementations thereof, refer to the analysis of beneficial effects of the first aspect and the implementations thereof. Details are not described herein again.

DESCRIPTION OF EMBODIMENTS

In the following description, to illustrate instead of limiting, details such as a particular system, device, and technology are provided to make a thorough understanding of the embodiments of the present disclosure. However, a person skilled in the art should know that the embodiments of the present disclosure may also be implemented in other embodiments without these details. In other cases, detailed descriptions of well-known apparatuses, circuits, and methods are omitted, so that the embodiments of the present disclosure are described without being obscured by unnecessary details.

The term "and/or" in the embodiments of the present disclosure describes only an association relationship for describing associated objects and represents that three relationships may exist. For example, A and/or B may represent the following three cases: Only A exists, both A and B exist, and only B exists.

In the specification, claims, and accompanying drawings of the present disclosure, the terms "first", "second", "third", and so on are intended to distinguish different objects but do not indicate a particular order.

To facilitate understanding various embodiments, related elements in various embodiments are first described.

Figure 1:
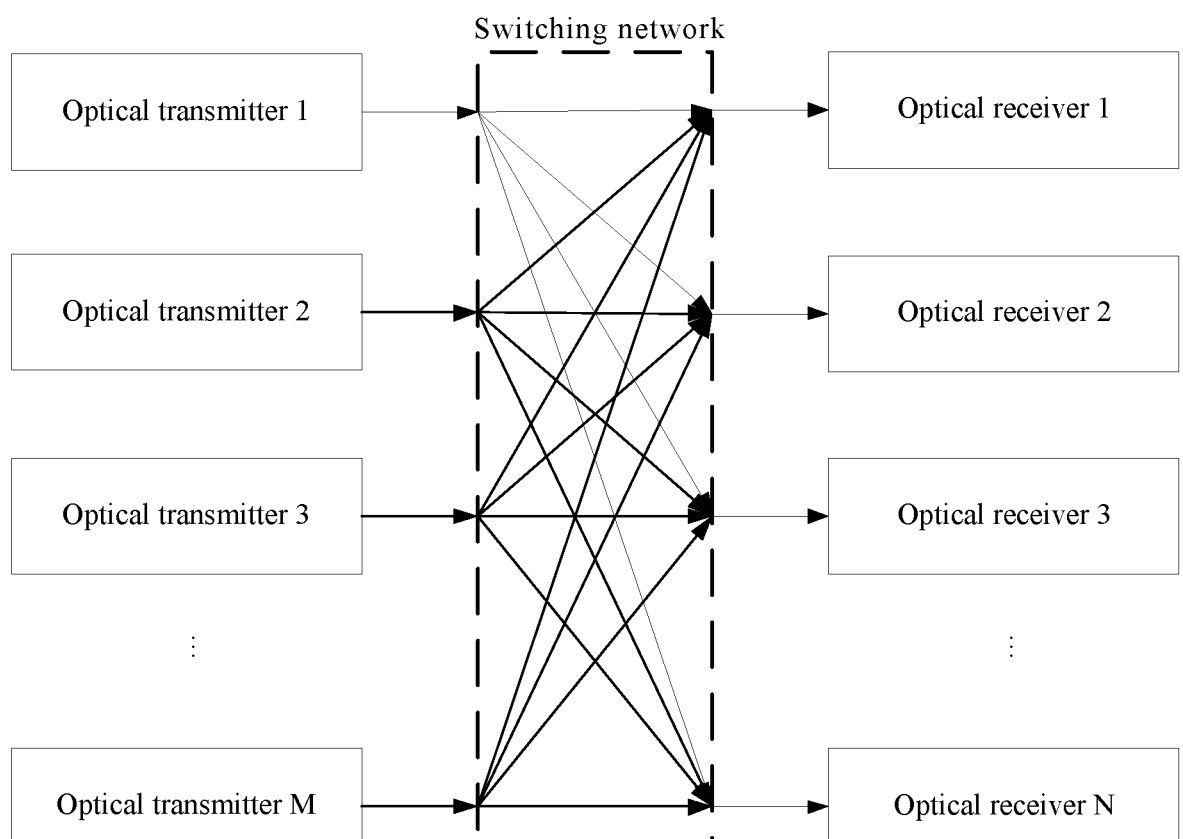
FIG. 1 is an architectural diagram of an optical fiber transmission system according to an embodiment of the present disclosure.

A signal processing method provided in the embodiments in accordance with the present disclosure may be applied to various optical fiber transmission systems. FIG. 1 is an architectural diagram of an optical fiber transmission system. The optical fiber transmission system may include M optical transmitters and N optical receivers. As shown in FIG. 1, the M optical transmitters are marked as an optical transmitter 1, an optical transmitter 2, an optical transmitter 3, . . . , and an optical transmitter M. The N optical receivers are marked as an optical receiver 1, an optical receiver 2, an optical receiver 3, . . . , and an optical receiver N. The optical transmitters are connected to the optical receivers by using a switching network. Each optical transmitter may transmit a signal to a plurality of optical receivers.

A transmission rate of an existing optical fiber transmission system is usually 100 Gbps.

An increase in the transmission rate of the optical fiber transmission system is limited by technology development of the optical transceiver. For example, if the transmission rate of the optical fiber transmission system needs to be 400 Gbps and a 16 quadrature amplitude modulation (QAM) modulation format is used, a symbol rate of the optical transceiver needs to be 60 gigahertz (GHz). However, a 64 QAM modulation format has a relatively high requirement on linearity of the optical transceiver. Consequently, an optical fiber transmission system with a high transmission rate is implemented at relatively high costs.

According to the signal processing method provided in various embodiments, a spectral bandwidth of a digital signal is reduced by processing the digital signal. In this way, requirements on a sampling rate and a bandwidth of a DAC when the optical transmitter transmits the digital signal are reduced, so that a transmission rate of the optical fiber transmission system is increased without changing an existing optical transceiver structure.

Device structures in various embodiments are described in detail below. It may be understood that an optical transceiver includes an optical transmitter and an optical receiver, or includes a module having a function of an optical transmitter and a module having a function of an optical receiver.

Figure 2:
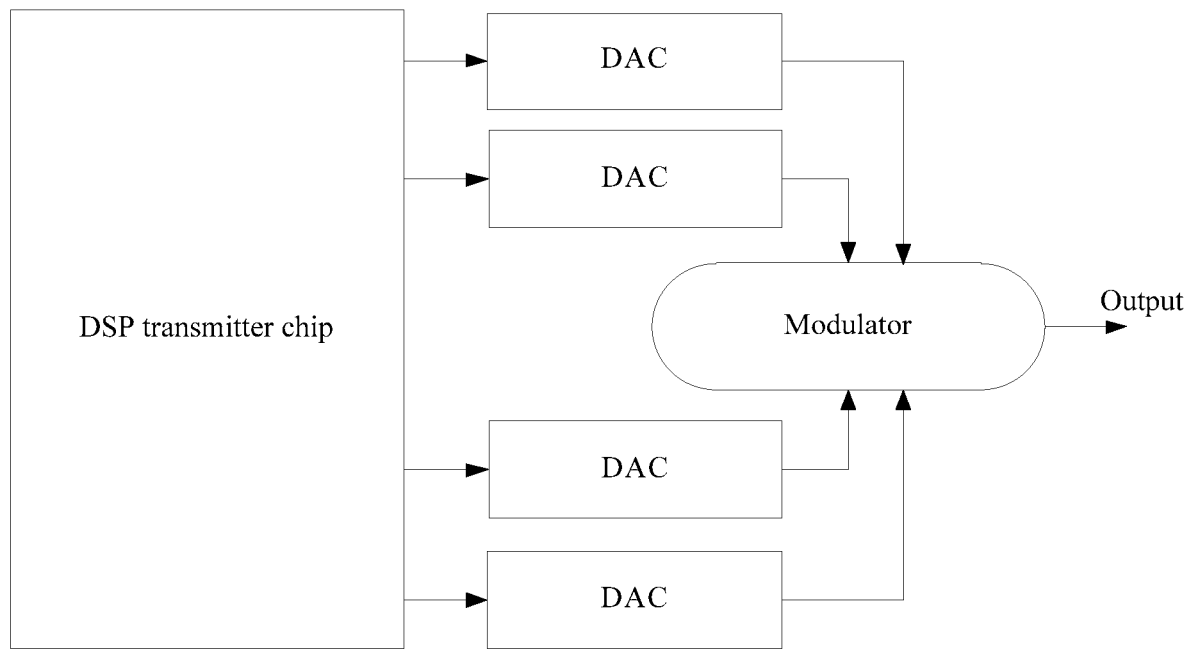
FIG. 2 is a schematic structural diagram of an optical transmitter according to an embodiment of the present disclosure.

FIG. 2 is a schematic structural diagram of an optical transmitter. The optical transmitter includes a digital signal processing (DSP) transmitter chip, DACs (where there may be two or four DACs, and FIG. 2 is described by using an example in which four DACs are connected to the DSP transmitter chip) connected to the DSP transmitter chip, and a modulator connected to the four DACs.

The DSP transmitter chip is a microprocessor for a digital signal processing operation. The DSP transmitter chip is mainly configured to rapidly implement various digital signal processing algorithms in real time. When the optical transmitter transmits digital signals, N random sequences first enter the optical transmitter, and the DSP transmitter chip maps the random sequences to generate M digital signals, where M is less than or equal to N. The digital signals are modulated by using an intensity modulation scheme such as binary on-off keying (On-Off Keying, OOK) or pulse amplitude modulation (Pulse Amplitude Modulation, PAM). Then, Nyquist filtering are performed on the digital signals. Each filtered digital signal moves to a specified frequency channel location by using single sideband modulation and up-conversion. Finally, the digital signals are added to obtain a synthesized modulation signal. The synthesized modulation signal includes four signals, namely, XI, XQ, YI, and YQ. The signals are separately used to drive an I-channel modulator in an X-polarization branch, a Q-channel modulator in the X-polarization branch, an I-channel modulator in a Y-polarization branch, and a Q-channel modulator in the Y-polarization branch that are of a dual-polarization in-phase quadrature (DP-IQ) modulator of the optical transmitter. After dispersion pre-compensation and pre-emphasis, the synthesized modulation signal is converted into an analog signal by using the DAC of the optical transmitter, and the analog signal enters the DP-IQ modulator, to generate an independent optical signal.

Figure 3:
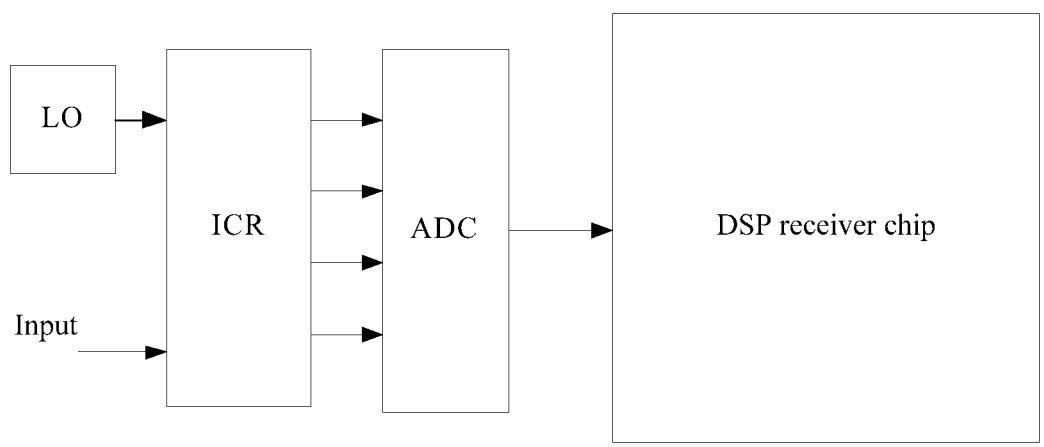
FIG. 3 is a schematic structural diagram of an optical receiver according to an embodiment of the present disclosure.

FIG. 3 is a diagram of an example optical receiver in accordance with the disclosure. The optical receiver shown in FIG. 3 includes a local oscillator LO, an integrated coherent receiver (ICR) connected to the LO, an ADC connected to the ICR, and a DSP receiver chip connected to the ADC. After receiving an optical signal, the ICR of the optical receiver completes coherent detection and optical-to-electrical conversion in combination with the LO, to obtain K analog signals. Then, the K analog signals are sent to the ADC of the optical receiver for analog-to-digital conversion, to obtain K digital signals. Moreover, the K digital signals are received and processed inside the DSP receiver chip of the optical receiver: First, dispersion compensation processing is performed; then, polarization demultiplexing processing is performed, to obtain double channels of output signals, and signal equalization and decoding processing are performed on each output signal, to recover a digital signal having a feature of an original digital signal.

It should be noted that the optical transceiver in the embodiments of the present disclosure may be a coherent optical transceiver, or may be an incoherent optical transceiver. This is not limited in the present disclosure. In addition, a signal processing method in the following embodiments of the present disclosure is described by using a digital signal as an example.

Figure 4:
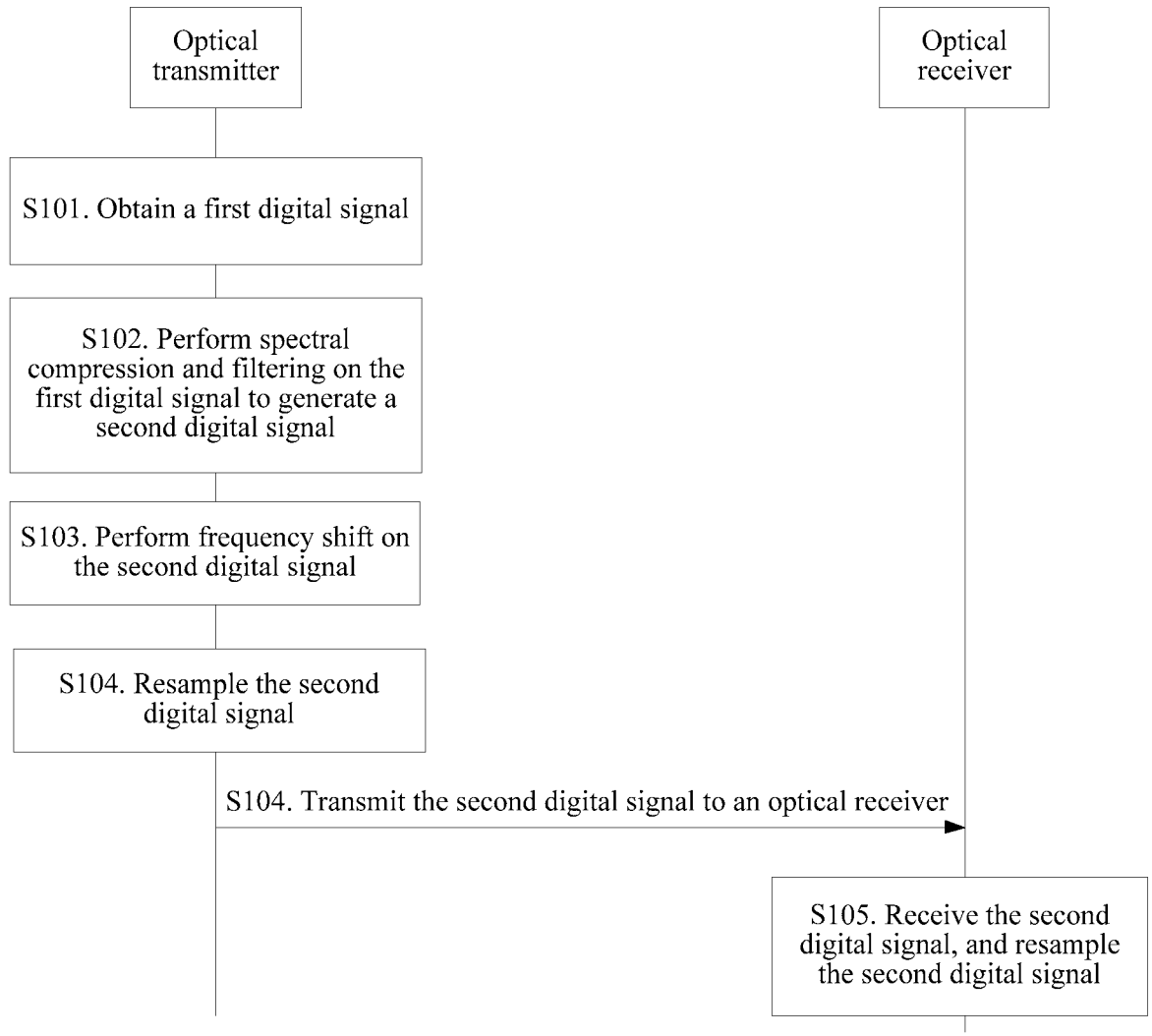
FIG. 4 is a schematic flowchart 1 of a signal processing method according to an embodiment of the present disclosure.

FIG. 4 is a flowchart of a signal processing method according to an embodiment of the present disclosure. The signal processing method may be applied to various optical fiber transmission systems.

Referring to FIG. 4, the signal processing method includes the following steps.

S101. An optical transmitter obtains a first digital signal, where the first digital signal is a one-dimensional bipolar digital signal.

Figure 5:
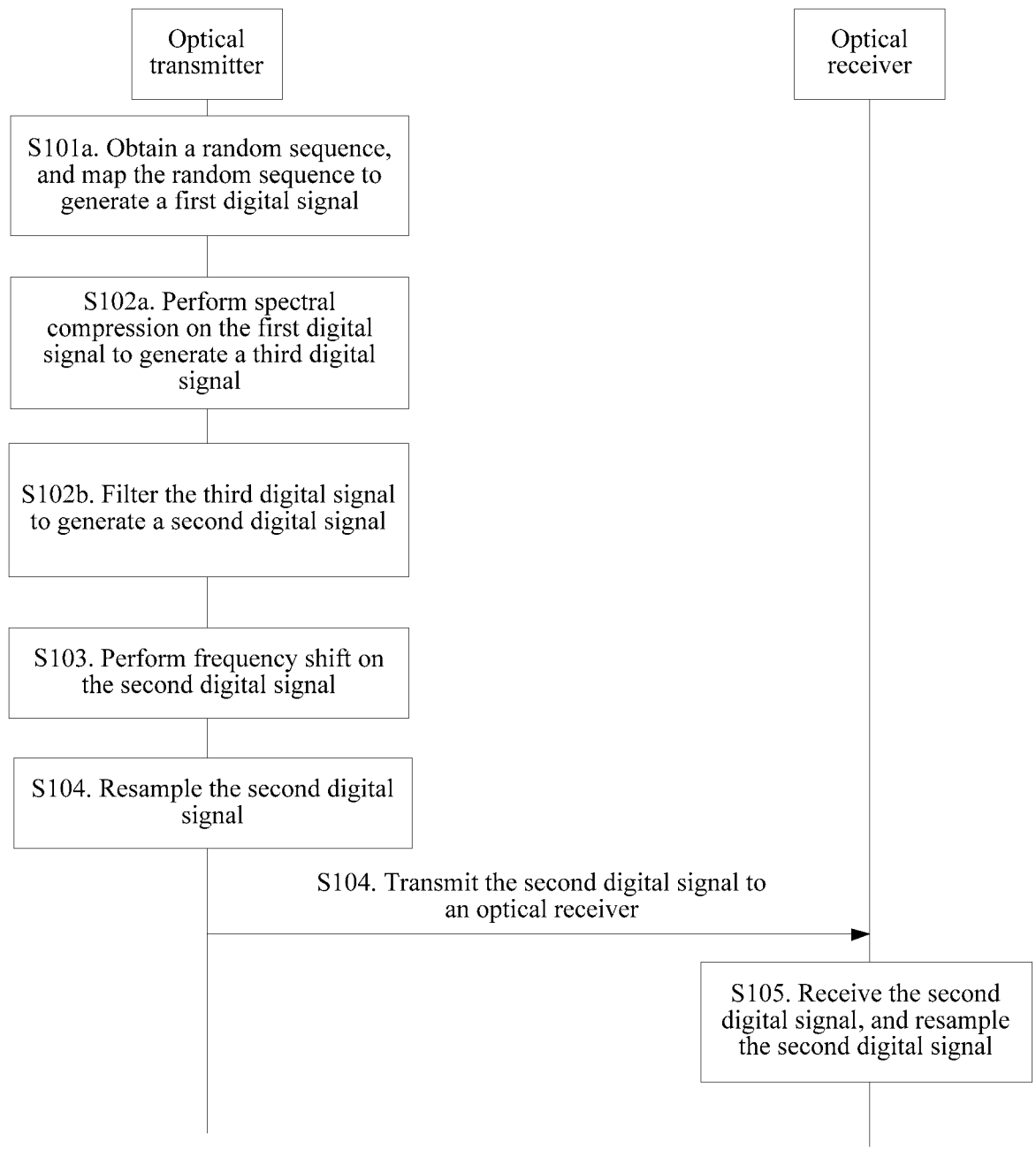
FIG. 5 is a schematic flowchart 2 of a signal processing method according to an embodiment of the present disclosure.

Referring to FIG. 5, step S101 may include step S101a in some embodiments.

S101a. The optical transmitter obtains a random sequence, and maps the random sequence to generate the first digital signal.

A manner in which the optical transmitter maps the random sequence to generate the first digital signal may be any of existing mapping manners. This is not limited herein.

Optionally, the first digital signal X satisfies $X=\pm(kn+1)$, where k is a constant of any value, and $n \in 0, 1, 2, 3, \ldots$.

Figure 6:
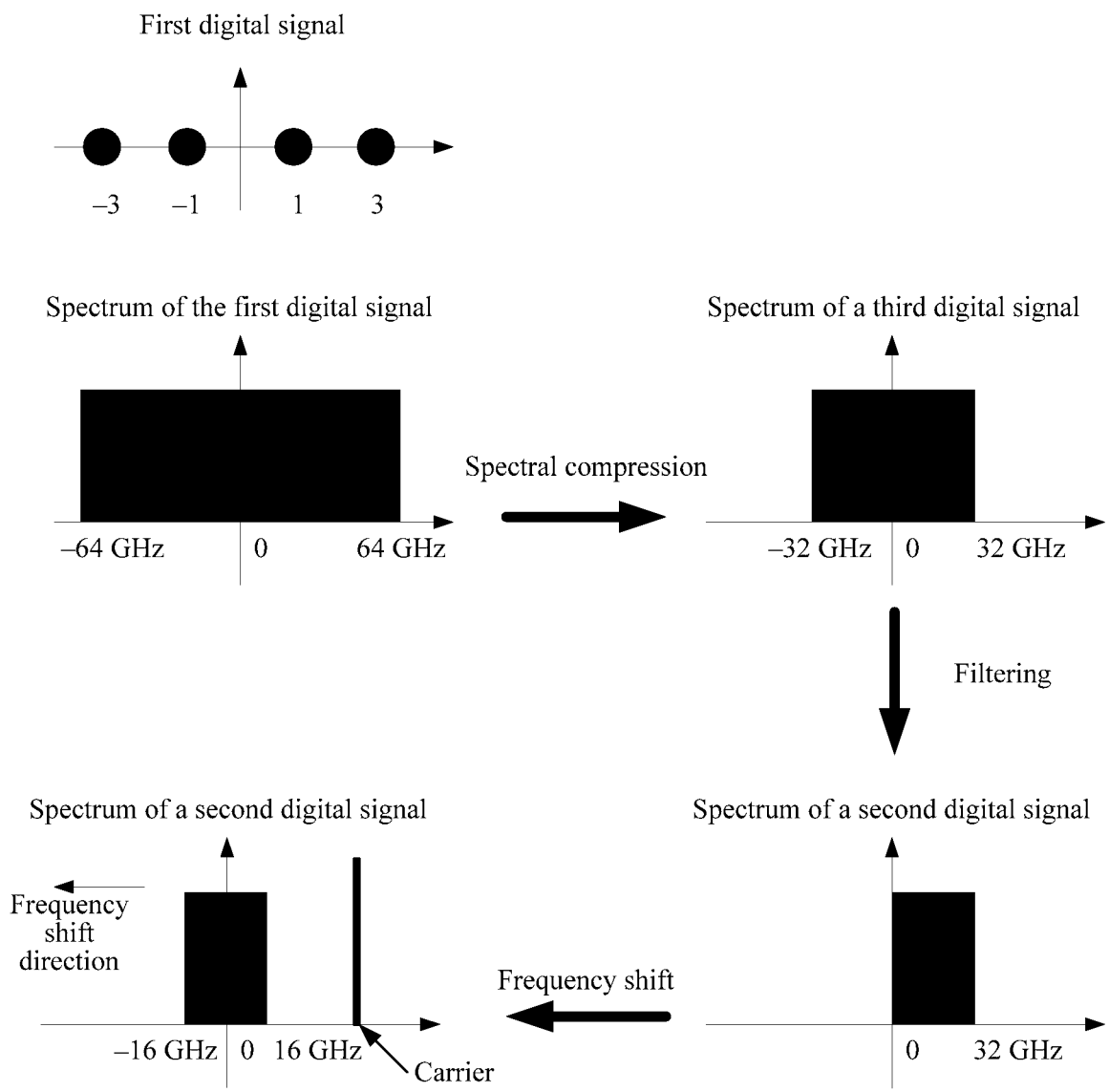
FIG. 6 is a schematic flowchart of processing a first digital signal by an optical transmitter according to an embodiment of the present disclosure.

For example, FIG. 6 is a schematic flowchart of processing the first digital signal by the optical transmitter. For example, the first digital signal is a 4 level-binary phase shift keying-amplitude phase shift keying (4-BPSK-APSK) signal, and n is 0 and 1. Assuming that k=2, the first digital signal is [−3, −1, 1, 3]. A spectral bandwidth of the first digital signal is 128 GHz.

S102. The optical transmitter performs spectral compression and filtering on the first digital signal to generate a second digital signal.

In some embodiments, referring to FIG. 5, step S102 may include steps S102a and S102b.

S102a. The optical transmitter performs spectral compression on the first digital signal to generate a third digital signal, where a spectral bandwidth of the third digital signal is less than a spectral bandwidth of the first digital signal.

For example, referring to FIG. 6, the optical transmitter first performs spectral compression on the first digital signal. In some embodiments, the optical transmitter may use a pulse shaping digital filter such as Nyquist to perform spectral compression on the first digital signal, to generate the third digital signal. If the pulse shaping digital filter such as Nyquist is used to perform spectral compression on the first digital signal, the spectral bandwidth of the third digital signal is approximately a half of the spectral bandwidth of the first digital signal. That is, the spectral bandwidth of the third digital signal is approximately 64 GHz.

It should be noted that because the optical transmitter may use different pulse shaping digital filters to perform spectral compression on the first digital signal, a roll down factor of each pulse shaping digital filter is different, and the spectral bandwidth of the third digital signal after the spectral compression is related to a value of the roll down factor of the pulse shaping digital filter, during actual application, the spectral bandwidth of the third digital signal is not limited to be reduced to a half of the spectral bandwidth of the first digital signal. Roll down factor=(actual bandwidth of a digital signal−ideal bandwidth of the digital signal)/ideal bandwidth of the digital signal.

S102b. The optical transmitter filters the third digital signal to generate the second digital signal, where the second digital signal is a positive spectral part or a negative spectral part of the third digital signal.

For example, referring to FIG. 6, the third digital signal is filtered by a band-pass filter in the optical transmitter, and the negative spectral part of the third digital signal is filtered out. That is, the remaining positive spectral part of the third digital signal is the second digital signal generated by the optical transmitter. The positive spectral part and the negative spectral part of the third digital signal are conjugate symmetry. Therefore, after the negative spectral part of the third digital signal is filtered out, effective spectrum information (where the effective spectrum information exists in the positive spectral part and the negative spectral part) of the third digital signal is not lost, and an optical receiver may recover all original spectrum information of the third digital signal through matched filtering during subsequent signal processing.

S103. The optical transmitter performs frequency shift on the second digital signal, where a center location of a spectrum of the frequency-shifted second digital signal is at a frequency of 0.

For example, referring to FIG. 6, after the filtering, by the optical transmitter, the third digital signal to generate the second digital signal, to further reduce a spectral bandwidth of the second digital signal, the optical transmitter performs frequency shift on the second digital signal, so that the center location of the spectrum of the frequency-shifted second digital signal is at the frequency of 0.

Specifically, the second digital signal shown in FIG. 6 is the positive spectral part of the third digital signal. Therefore, the optical transmitter needs to perform frequency shift on the second digital signal toward left (a direction shown by an arrow in FIG. 6), and the spectral bandwidth of the frequency-shifted second digital signal is 32 GHz.

It may be understood that a frequency shift direction of the second digital signal is related to step S102b. If the positive spectral part of the third digital signal is filtered out in step S102b, the frequency shift direction of the second digital signal is a positive spectral direction. If the negative spectral part of the third digital signal is filtered out in step S102b, the frequency shift direction of the second digital signal is a negative spectral direction.

S104. The optical transmitter resamples the second digital signal, and transmits the resampled second digital signal to an optical receiver.

Before transmitting the second digital signal, the optical transmitter may further resample the second digital signal, to adapt to a sampling rate of a DAC in the optical transmitter. Compared with the spectral bandwidth of the first digital signal, the spectral bandwidth of the second digital signal is already significantly reduced. Therefore, a requirement on the sampling rate of the DAC may also be reduced. Through the foregoing operation, requirements on the sampling rate and a bandwidth of the DAC are actually reduced, so that a transmission rate of an optical fiber transmission system can be increased without changing an existing optical transceiver structure.

It should be noted that the resampling in this embodiment may include a plurality of methods for sampling a digital signal, for example, upsampling and downsampling. This is not limited herein.

Optionally, referring to FIG. 6, the spectrum of the second digital signal further includes a carrier, so that the optical receiver detects the second digital signal based on the carrier.

In some embodiments, the carrier included in the spectrum of the second digital signal may be originally in the spectrum of the second digital signal, or may be added to the spectrum of the second digital signal by a DSP of the optical transmitter. This is not limited in this embodiment of the present disclosure.

It should be noted that the carrier may be located on a left side or right side of the spectrum of the second digital signal, and is used to directly detect a beat frequency between the carrier and an effective signal in the optical fiber transmission system, to implement direct detection of a PAM signal.

S105. The optical receiver receives the second digital signal transmitted by the optical transmitter, and resamples the second digital signal.

Step 105 is a step corresponding to step S104. The optical receiver resamples the second digital signal, to adapt to a sampling rate of an ADC and a processing rate of the DSP.

Figure 7:
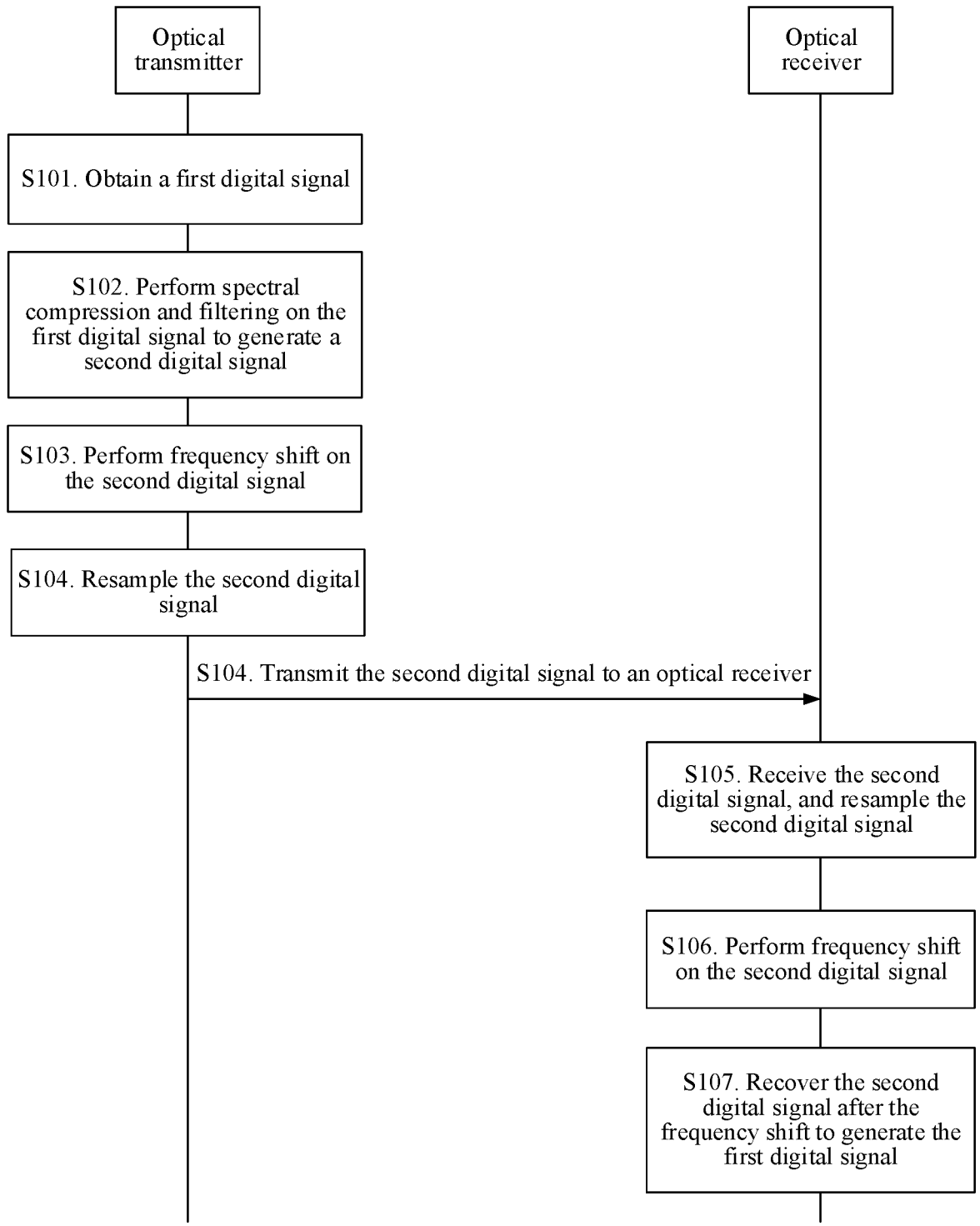
FIG. 7 is a schematic flowchart 3 of a signal processing method according to an embodiment of the present disclosure.

In some embodiments, referring to FIG. 7, after step S105 is performed, the signal processing method provided in this embodiment may further include S106 and S107.

S106. The optical receiver performs frequency shift on the second digital signal, where a spectral edge of the second digital signal after the frequency shift is at a frequency of 0.

Figure 8:
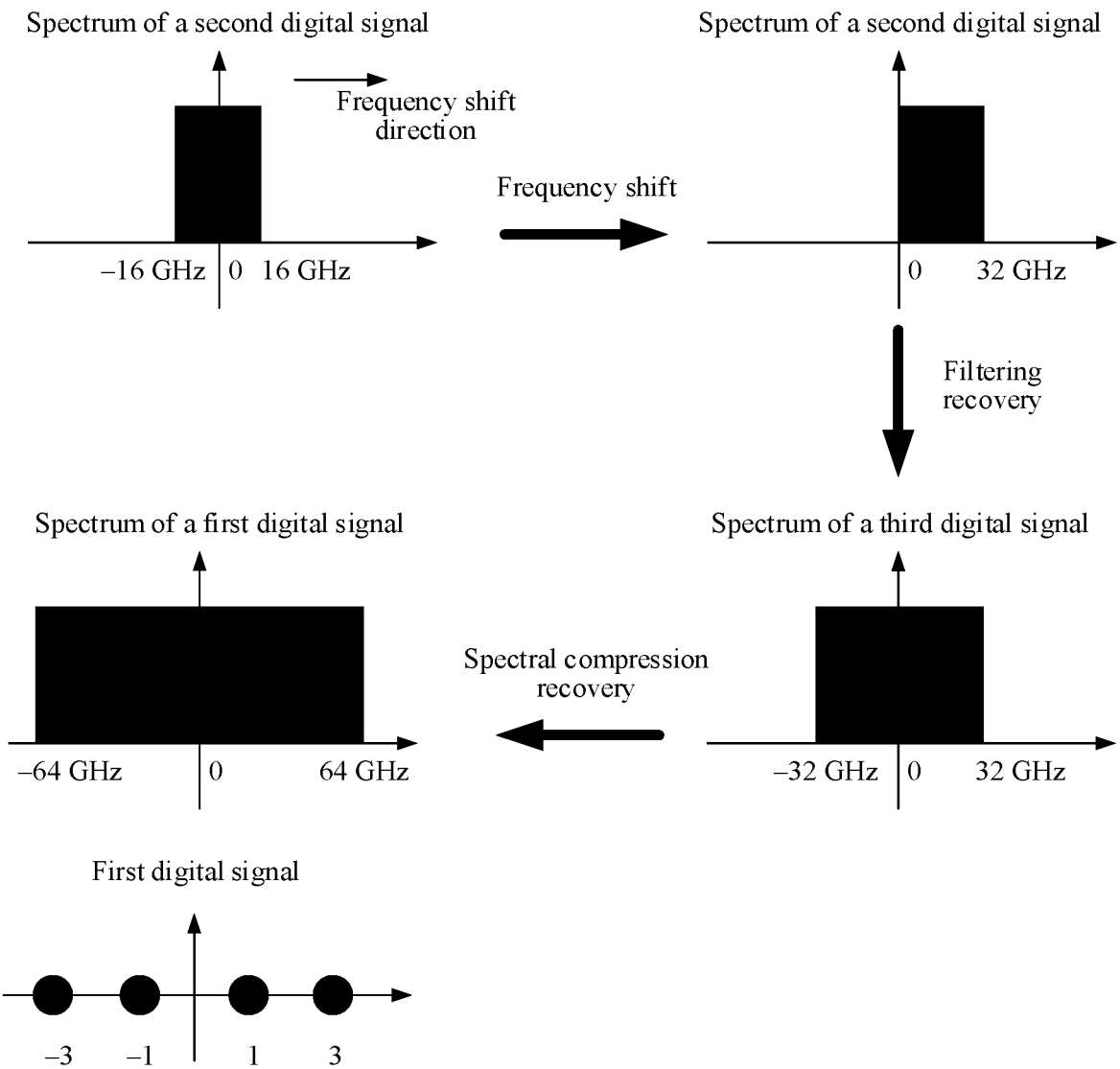
FIG. 8 is a schematic flowchart of processing a second digital signal by an optical receiver according to an embodiment of the present disclosure.

For example, FIG. 8 is a schematic flowchart of processing the second digital signal by the optical receiver. The optical receiver performs frequency shift on the second digital signal, so that the spectral edge of the second digital signal after the frequency shift is at a frequency of 0. In some embodiments, because the second digital signal shown in FIG. 8 is the positive spectral part of the third digital signal, the optical transmitter needs to perform frequency shift on the second digital signal toward right (a direction shown by an arrow in FIG. 8), and the spectral bandwidth of the frequency-shifted second digital signal is 32 GHz.

It may be understood that a frequency shift direction of the second digital signal is related to step S102b. If the positive spectral part of the third digital signal is filtered out in step S102b, the frequency shift direction of the second digital signal is the positive spectral direction, and the frequency shift direction of the second digital signal is the negative spectral direction. If the negative spectral part of the third digital signal is filtered out in step S102b, the frequency shift direction of the second digital signal is the negative spectral direction, and the frequency shift direction of the second digital signal is the positive spectral direction.

S107. The optical receiver recovers the second digital signal after the frequency shift to generate the first digital signal, where the first digital signal is a one-dimensional bipolar digital signal.

Figure 9:
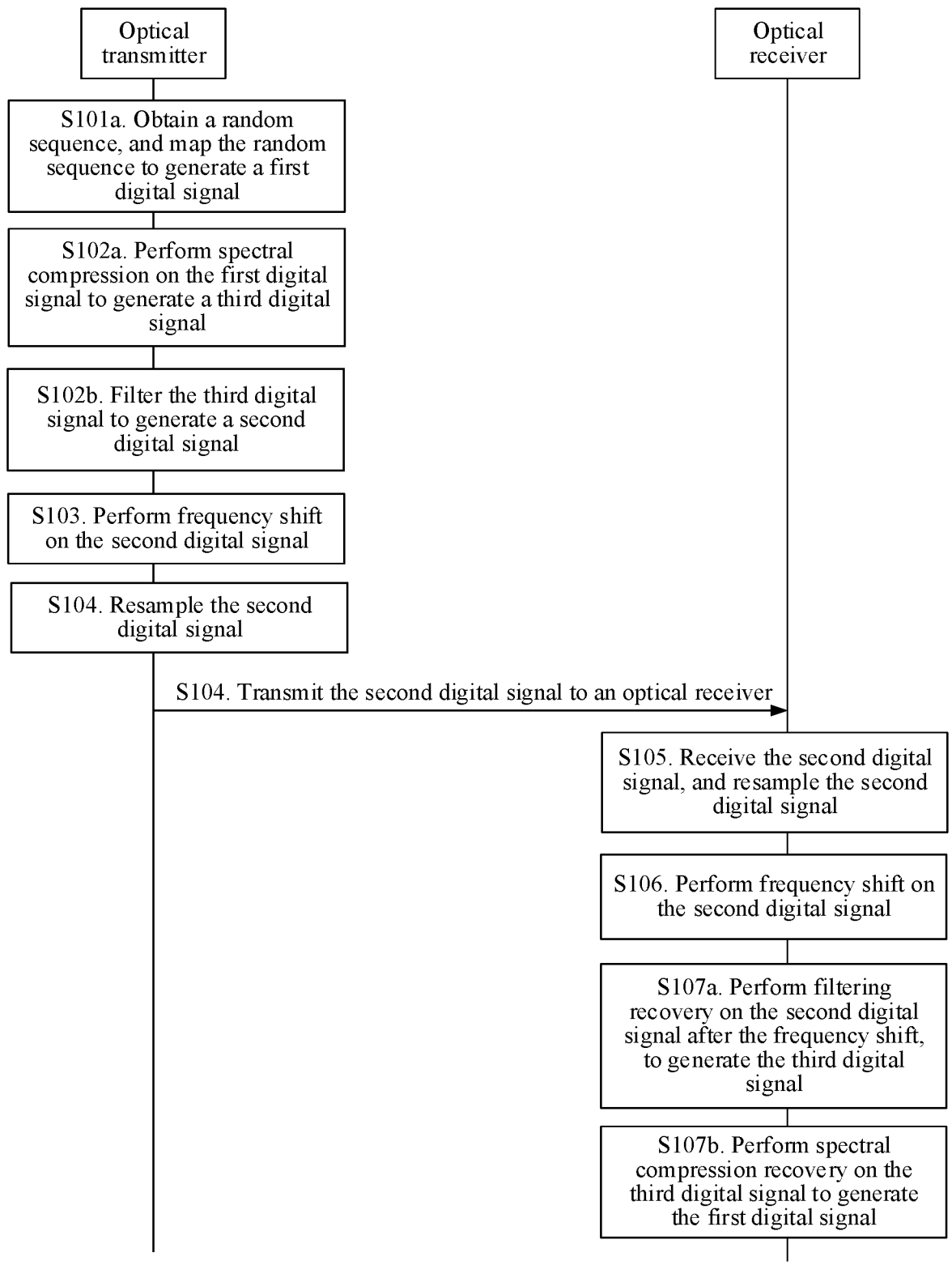
FIG. 9 is a schematic flowchart 4 of a signal processing method according to an embodiment of the present disclosure.

In some embodiments, referring to FIG. 9, step S107 may include S107a and S107b.

S107a. The optical receiver performs filtering recovery on the second digital signal after the frequency shift, to generate the third digital signal, where the second digital signal is the positive spectral part or the negative spectral part of the third digital signal.

For example, referring to FIG. 8, the optical receiver performs filtering recovery on the second digital signal after the frequency shift, to generate the third digital signal. Because the positive spectral part and the negative spectral part of the third digital signal are conjugate symmetry, the optical receiver may recover all spectrum information of the third digital signal through matched filtering by using the second digital signal.

S107b. The optical receiver performs spectral compression recovery on the third digital signal to generate the first digital signal, where the spectral bandwidth of the third digital signal is less than the spectral bandwidth of the first digital signal.

For example, referring to FIG. 8, the optical receiver performs spectral compression recovery on the third digital signal to generate the first digital signal. That is, the spectral bandwidth of the first digital signal is 128 GHz.

It should be noted that after performing a series of processing (such as spectral compression, filtering, and frequency shift) on the first digital signal, the optical transmitter generates the second digital signal and transmits the second digital signal to the optical receiver, and the optical receiver may obtain an original digital signal after recovering the second digital signal in an ideal condition. However, during actual application, when recovering the second digital signal, the optical receiver may be incapable of obtaining the original digital signal completely due to factors such as noise and transmission loss. In this case, it only needs to be ensured that an obtained first digital signal has a feature of the original digital signal.

According to the signal processing method provided in this embodiment, the optical transmitter obtains the first digital signal. The first digital signal is a one-dimensional bipolar digital signal. The optical transmitter performs spectral compression and filtering on the first digital signal to generate the second digital signal. The optical transmitter performs frequency shift on the second digital signal. The center location of the spectrum of the frequency-shifted second digital signal is at the frequency of 0. Based on the descriptions of the foregoing embodiment, the optical transmitter can perform spectral compression and filtering on the first digital signal to generate the second digital signal, so that compared with the spectral bandwidth of the first digital signal, the spectral bandwidth of the second digital signal is reduced. When spectral compression is performed on a digital signal, a spectral bandwidth of the digital signal is related to a value of a roll down factor of a pulse shaping digital filter in the optical transmitter. In addition, the spectral bandwidth of the digital signal generated after only the spectral compression is approximately a half of the spectral bandwidth of the digital signal before the compression. A high transmission rate of the optical fiber transmission system still cannot be satisfied. Therefore, the optical transmitter further performs frequency shift on the second digital signal, so that the spectral bandwidth of the frequency-shifted second digital signal is further reduced. In this way, requirements on the sampling rate and the bandwidth of the DAC when the optical transmitter transmits the second digital signal are reduced, so that a transmission rate of the optical fiber transmission system can be increased without changing an existing optical transceiver structure.

An embodiment provides a DSP transmitter chip. The DSP transmitter chip may be integrated in an optical transmitter. The optical transmitter is configured to perform steps performed by the optical transmitter in the foregoing signal processing method. The optical transmitter provided in this embodiment of the present disclosure may include modules corresponding to corresponding steps.

In this embodiment, functional modules of the optical transmitter may be divided based on the foregoing method example. For example, the functional modules may be divided based on functions, or two or more functions may be integrated into one functional module. The integrated module may be implemented in a form of hardware, or may be implemented in a form of a software functional module. In this embodiment, the module division is an example, and is merely logical function division, and there may be other division manners during actual application.

Figure 10:
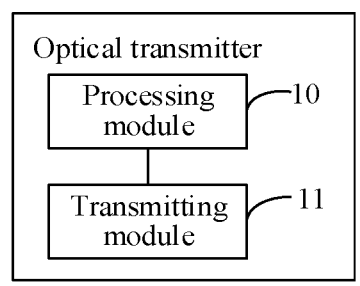
FIG. 10 is a schematic structural diagram 1 of an optical transmitter according to an embodiment of the present disclosure.

When the functional modules are divided based on the functions, FIG. 10 is a possible schematic structural diagram of the optical transmitter used in the foregoing embodiments. As shown in FIG. 10, the optical transmitter includes a processing module 10 and a transmitting module 11. The processing module 10 is configured to support the optical transmitter in performing S101 to S104 in FIG. 4, FIG. 5, FIG. 7, and FIG. 9. The transmitting module 11 is configured to support the optical transmitter in performing S104 in FIG. 4, FIG. 5, FIG. 7, and FIG. 9. All related content of the steps in the foregoing method embodiments may be quoted to function descriptions of the corresponding functional modules. Details are not described herein again.

Figure 11:
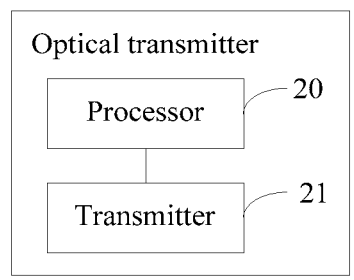
FIG. 11 is a schematic structural diagram 2 of an optical transmitter according to an embodiment of the present disclosure.

When an integrated unit is used, FIG. 11 is an example structural diagram of the optical transmitter used in the foregoing embodiments. As shown in FIG. 11, the optical transmitter includes a processor 20 and a transmitter 21. The transmitter 21 is configured to support the optical transmitter in communicating with another device. For example, the transmitter 21 is configured to support the optical transmitter in performing S104 in FIG. 4, FIG. 5, FIG. 7, and FIG. 9. The processor 20 is configured to control and manage actions of the optical transmitter. For example, the processor 20 is configured to support the optical transmitter in performing S101 to S104 in FIG. 4, FIG. 5, FIG. 7, and FIG. 9, and/or is used in another process of a technology described in this specification.

The processor 20 may be a processor or a controller, for example, may be a central processing unit (CPU) or a digital signal processor (DSP). The processor 20 may implement or execute various example logical blocks, modules, and circuits described with reference to content disclosed in this application. The transmitter 21 may be a transceiver circuit, a communications interface, or the like.

In addition, the optical transmitter provided in this embodiment of the present disclosure may further include a memory. The memory may be a read-only memory (ROM), or another type of static storage device that can store static information and an instruction, a random access memory (RAM) or another type of dynamic storage device that can store information and an instruction, or may be an electrically erasable programmable read-only memory (EEPROM), a magnetic disk storage medium or another magnetic storage device, or any other medium that can carry or store expected program code in an instruction form or in a data structure form and that can be accessed by the optical transmitter, but is not limited thereto.

Further, the memory may independently exist, or may be integrated with the processor 20. This is not limited in the present disclosure.

An embodiment provides a DSP receiver chip. The DSP receiver chip may be integrated in an optical receiver. The optical receiver is configured to perform steps performed by the optical receiver in the foregoing signal processing method. The optical receiver provided in this embodiment of the present disclosure may include modules corresponding to corresponding steps.

In this embodiment, functional modules of the optical receiver may be divided based on the foregoing method example. For example, the functional modules may be divided based on functions, or two or more functions may be integrated into one functional module. The integrated module may be implemented in a form of hardware, or may be implemented in a form of a software functional module. In this embodiment of this application, the module division is an example, and is merely logical function division, and there may be other division manners during actual application.

Figure 12:
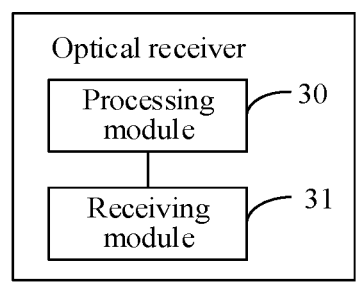
FIG. 12 is a schematic structural diagram 1 of an optical receiver according to an embodiment of the present disclosure.

When the functional modules are divided based on the functions, FIG. 12 is an example schematic structural diagram of the optical receiver that may be used to implement foregoing embodiments. As shown in FIG. 12, the optical receiver includes a processing module 30 and a receiving module 31. The processing module 30 can be configured to support the optical receiver by performing S105 to S107 illustrated in FIG. 4, FIG. 5, FIG. 7, and FIG. 9 and described herein. The receiving module 31 can be configured to support the optical receiver by performing S105 illustrated in FIG. 4, FIG. 5, FIG. 7, and FIG. 9, and described herein. All related content of the steps in the foregoing method embodiments may be quoted to function descriptions of the corresponding functional modules. Details are not described herein again.

Figure 13:
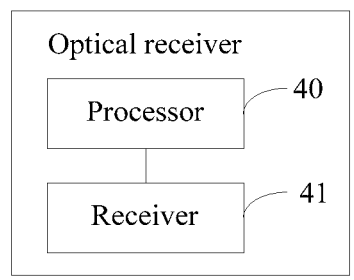
FIG. 13 is a schematic structural diagram 2 of an optical receiver according to an embodiment of the present disclosure.

When an integrated unit is used, FIG. 13 shows a diagram of an example optical receiver for implementing foregoing embodiments. As shown in FIG. 13, the optical receiver includes a processor 40 and a receiver 41. The receiver 41 can be configured to support the optical receiver in communicating with another device. For example, the receiver 41 can be configured to support the optical receiver by performing S105 illustrated FIG. 4, FIG. 5, FIG. 7, and FIG. 9, and described herein. The processor 40 can be configured to control and manage actions of the optical receiver. For example, the processor 40 can be configured to support the optical receiver in performing S105 to S107 illustrated in FIG. 4, FIG. 5, FIG. 7, and FIG. 9 and described herein, and/or is used in another process of a technology described in this specification.

The processor 40 may be a processor or a controller, for example, may be a CPU or a DSP. The processor 40 may implement or execute various example logical blocks, modules, and circuits described with reference to content disclosed in this application. The receiver 41 may be a transceiver circuit, a communications interface, or the like.

In addition, the optical receiver provided in this embodiment may further include a memory. The memory may be a ROM, or another type of static storage device that can store static information and an instruction, a RAM or another type of dynamic storage device that can store information and an instruction, or may be an EEPROM, a magnetic disk storage medium or another magnetic storage device, or any other medium that can carry or store expected program code in an instruction form or in a data structure form and that can be accessed by the optical receiver, but is not limited thereto. Further, the memory may independently exist, or may be integrated with the processor 40. This is not limited in the present disclosure.

An embodiment provides an optical transceiver. The optical transceiver includes the optical transmitter having any of the foregoing features and the optical receiver having any of the foregoing features. It should be noted that when an optical transmitter and an optical receiver are integrated in an optical transceiver, the optical transmitter shall transmit a second digital signal to an optical receiver that is not integrated in the optical transceiver in which the optical transmitter is located. In addition, when an optical transmitter and an optical receiver are integrated in an optical transceiver, a transmitter in the optical transmitter and a receiver in the optical receiver may be integrated in a communications interface.

An embodiment further provides an optical fiber transmission system. The optical fiber transmission system includes at least one optical transmitter having any of the foregoing features and at least one optical receiver having any of the foregoing features; or includes at least one optical transceiver having any of the foregoing features.

The foregoing descriptions about implementations allow a person skilled in the art to clearly understand that, for the purpose of convenient and brief description, only division of the foregoing functional modules is taken as an example for illustration. During actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

In various embodiments in accordance with the present disclosure, it should be understood that the disclosed system, apparatus, and method may be implemented in other manners.

For example, the described apparatus embodiment is merely an example. For example, the module or unit division is merely logical function division and may be other division during actual implementation. For example, a plurality of units or components may be combined or integrated into another system.

When the integrated unit is implemented in the form of a software functional unit and sold or used as an independent product, the integrated unit may be stored in a computer-readable storage medium.

Based on such an understanding, all or some of the technical solutions of the embodiments of the present disclosure may be implemented in a form of a software product. The computer software product is stored in a storage medium and includes several instructions for instructing a computer device (which may be a personal computer, a server, a network device, or the like) or a processor to perform all or some of the steps of the methods described in the embodiments of the present disclosure. For example, the storage medium is any medium that can store program code, for example, a universal serial bus flash disk (U disk), a removable hard disk, a ROM, a RAM, a digital signal processing chip, a magnetic disc, or an optical disc.

Apparently, a person skilled in the art can make various modifications and variations to the embodiments of the present disclosure without departing from the scope of the present disclosure. In this way, the embodiments of the present disclosure are intended to cover these modifications and variations provided that they fall within the scope defined by the claims of the present disclosure.

What is claimed is:

1. A signal processing method, comprising:
obtaining, by an optical transmitter, a first digital signal, wherein the first digital signal is a one-dimensional bipolar digital signal;
performing, by the optical transmitter, spectral compression and filtering on the first digital signal to generate a second digital signal; and
performing, by the optical transmitter, frequency shift on the second digital signal, wherein a center location of a spectrum of the frequency-shifted second digital signal is at a frequency of 0.

2. The signal processing method according to claim 1, wherein obtaining, by the optical transmitter, the first digital signal comprises:
obtaining, by the optical transmitter, a random sequence, and mapping, by the optical transmitter, the random sequence to generate the first digital signal.

3. The signal processing method according to claim 1, wherein performing, by the optical transmitter, the spectral compression and filtering on the first digital signal to generate a second digital signal comprises:
performing, by the optical transmitter, spectral compression on the first digital signal to generate a third digital signal, wherein a spectral bandwidth of the third digital signal is less than a spectral bandwidth of the first digital signal; and
filtering, by the optical transmitter, the third digital signal to generate the second digital signal, wherein the second digital signal is a positive spectral part or a negative spectral part of the third digital signal.

4. The signal processing method according to claim 1, wherein after performing, by the optical transmitter, the frequency shift on the second digital signal, the method further comprises:
resampling, by the optical transmitter, the second digital signal, and transmitting the second digital signal after the resampling to an optical receiver.

5. The signal processing method according to claim 1, wherein the spectrum of the second digital signal further comprises a carrier.

6. A signal processing method, comprising:
performing, by an optical receiver, frequency shift on a second digital signal, wherein a spectral edge of the second digital signal after the frequency shift is at a frequency of 0; and
recovering, by the optical receiver, the second digital signal after the frequency shift to generate a first digital signal, wherein the first digital signal is a one-dimensional bipolar digital signal.

7. The signal processing method according to claim 6, wherein recovering, by the optical receiver, the second digital signal after the frequency shift to generate the first digital signal comprises:
performing, by the optical receiver, filtering recovery on the second digital signal after the frequency shift, to generate a third digital signal, wherein the second digital signal is a positive spectral part or a negative spectral part of the third digital signal; and
performing, by the optical receiver, spectral compression recovery on the third digital signal, to generate the first digital signal, wherein a spectral bandwidth of the third digital signal is less than a spectral bandwidth of the first digital signal.

8. The signal processing method according to claim 6, wherein before the performing, by an optical receiver, frequency shift on a second digital signal, the method further comprises:
receiving, by the optical receiver, the second digital signal transmitted by an optical transmitter, and resampling, by the optical receiver, the second digital signal.

9. The signal processing method according to claim 6, wherein the spectrum of the second digital signal further comprises a carrier.

10. An optical transmitter, wherein the optical transmitter comprises a processor, wherein
the processor is configured to: obtain a first digital signal, wherein the first digital signal is a one-dimensional bipolar digital signal; perform spectral compression and filtering on the first digital signal to generate a second digital signal; and perform frequency shift on the second digital signal, wherein a center location of a spectrum of the frequency-shifted second digital signal is at a frequency of 0.

11. The optical transmitter according to claim 10, wherein the processor is configured to: obtain a random sequence, and map the random sequence to generate the first digital signal.

12. The optical transmitter according to claim 10, wherein the processor is configured to: perform spectral compression on the first digital signal to generate a third digital signal, wherein a spectral bandwidth of the third digital signal is less than a spectral bandwidth of the first digital signal; and perform filtering on the third digital signal to generate the second digital signal, wherein the second digital signal is a positive spectral part or a negative spectral part of the third digital signal.

13. The optical transmitter according to claim 10, wherein the optical transmitter further comprises a transmitter;
the processor is further configured to resample the second digital signal after performing frequency shift on the second digital signal; and
the transmitter is configured to: after the processor resamples the second digital signal, transmit the resampled second digital signal to an optical receiver.

14. The optical transmitter according to claim 10, wherein the spectrum of the second digital signal further comprises a carrier.

* * * * *